June 28, 1960 L. F. LUCAS ET AL 2,942,912
MERCHANDISE SHIPPING CONTAINER AND MEANS FOR
REMOVABLY SECURING THE SAME ON MOTOR TRUCKS
Filed Sept. 5, 1956 3 Sheets-Sheet 1

INVENTORS
LESTER F. LUCAS
WALTER S. THOMAS
JOSEPH F. WITTMAN

BY
ATTORNEY

INVENTORS
LESTER F. LUCAS
WALTER S. THOMAS
JOSEPH F. WITTMAN

BY *Justin W. Macklin*

ATTORNEY

INVENTORS
LESTER F. LUCAS
WALTER S. THOMAS
JOSEPH F. WITTMAN

ATTORNEY

United States Patent Office 2,942,912
Patented June 28, 1960

2,942,912

MERCHANDISE SHIPPING CONTAINER AND MEANS FOR REMOVABLY SECURING THE SAME ON MOTOR TRUCKS

Lester F. Lucas, Willoughby Hills, Walter S. Thomas, Willoughby, and Joseph F. Wittman, Chagrin Falls, Ohio, assignors to The Redi-Load Body & Pallet Company, Cleveland, Ohio, a corporation of Ohio Filed Sept. 5, 1956, Ser. No. 608,143

6 Claims. (Cl. 296—35)

This invention relates to a material handling and transporting system in which various kinds of material may be loaded into container frames on pallets or in boxes comparable to truck bodies and adapted for convenient handling as a unit for loading the material thereinto and for placing upon a motor truck on which it may be securely held in transit, and from which it may be readily removed.

The material containing units, which may be considered to be the equivalent of pallets, but which, however, may be of an open frame type or a closed body type, may be moved to gather a load of assorted materials, or may be loaded at a given platform or on a lifting device and then be conveniently transferred to the frame of a motor truck, and with similar efficiency and convenience may be removed and unloaded at a delivery point.

Essential advantages thus gained are that by such a system and with the novel equipment of the present invention, any number of removable pallets, load frames or bodies may be being loaded at one point with the material or merchandise, while at the delivery point one or more may be unloaded while one material carrying unit is being transferred, either empty or loaded, back to the starting point. Obviously, this results in permitting the motor truck to be in transit a far greater percentage of the time, while the conveniently handled material container units, each, incidentally, of much less cost than the motor vehicle, may be being efficiently used, transported full, and returned empty or with a different load, with great economy of time and cost of equipment.

An object of the present invention is to provide simple, efficient, durable material containers, such as pallets, frames and closed bodies provided with structural means for cooperating with means for securing them onto the motor vehicle while in transit.

Likewise, an additional object of our invention is to provide a simple, convenient clamping and securing means which may be readily installed upon the chassis frame of a motor truck type of vehicle for securely locking the material carrying unit onto the truck frame, and which may be readily released for removal of a material carrying unit from the truck frame or platform.

Other objects and advantages will become apparent in the following specification which relates to the accompanying drawings, and in which.

Figure 1:
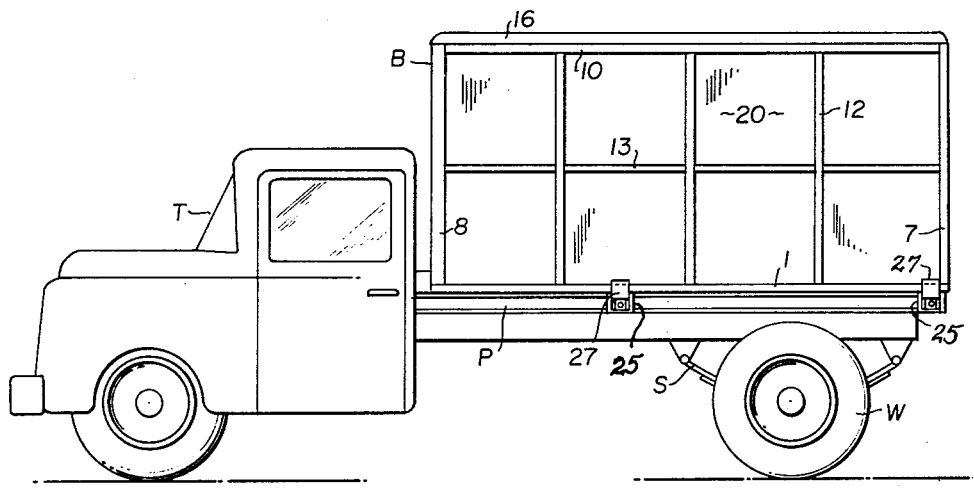
Fig. 1 is a side elevation of a truck showing one of our removable material container bodies thereon.

Describing the structures shown by the use of reference characters, T indicates a truck having a platform or support P on which the removable containers can be carried. The platform or like support is indicated as being mounted in the usual manner upon longitudinal channels, such as indicated at C, while S and W indicate the rear springs and wheels, respectively.

The closed body type of container is indicated generally at B, and which may have doors such as D closing its rear end. Obviously, other closing means, such as canvas coverings, curtains, or the like, may be used instead of the pair of doors, as shown.

Figure 4:
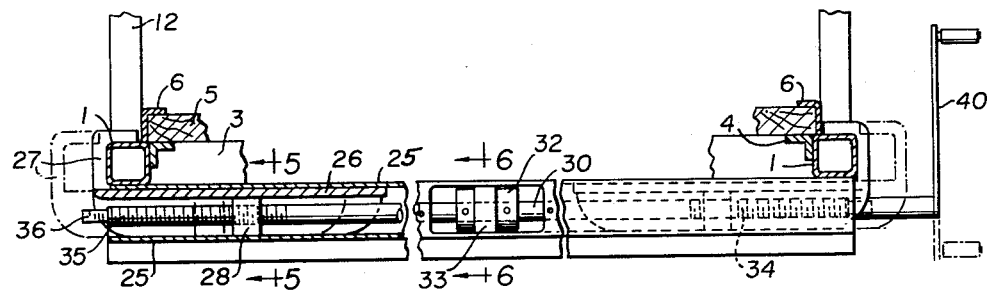
Fig. 4 is a transverse view showing the container clamping means partly in section.
Figure 5:
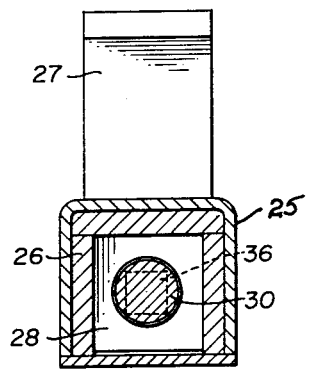
Fig. 5 is an enlarged sectional detail taken substantially on the line 5—5 of Fig. 4.
Figure 6:
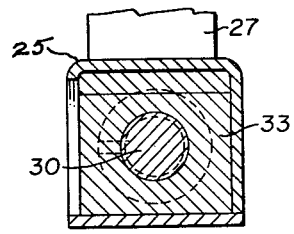
Fig. 6 is a similar sectional detail taken on a plane indicated by the line 6—6 of Fig. 4.
Figure 7:
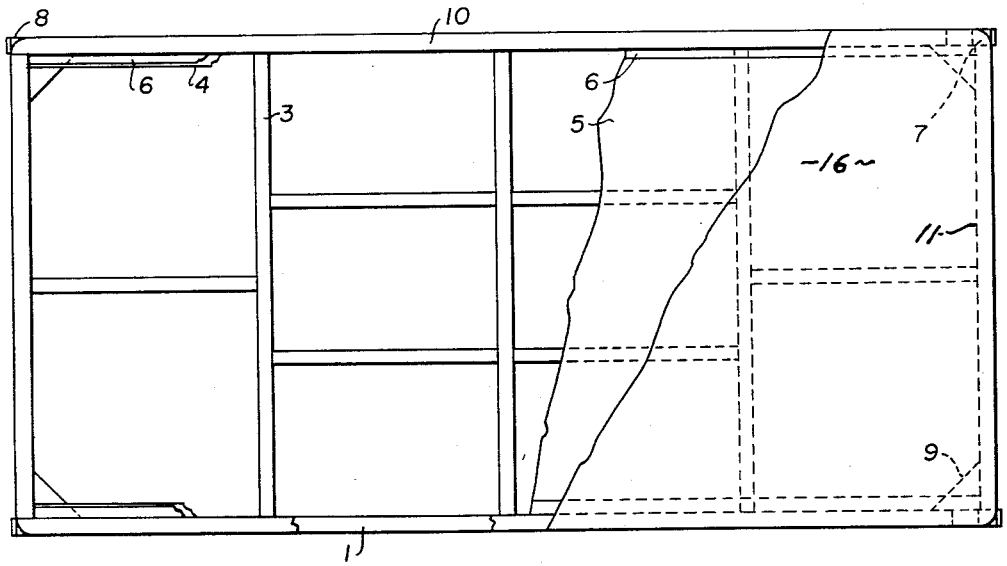
Fig. 7 is an elevational plan view showing a portion of the rough end frame broken away.
Figure 8:
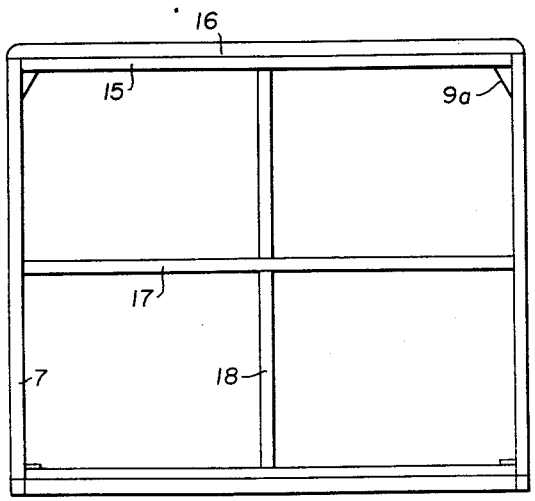
Fig. 8 is an end view of the framework construction of the closed container, such as shown in Figs. 1, 2 and 7.

The preferred construction of the container bottom includes side rails 1 which may be of square tubing, as indicated in Fig. 4, normally resting upon the top surface or floor support of the truck platform. Cross members 3, also preferably of square tubing, may connect the side rails at their ends and between in a framework indicated in the plan view of Fig. 7. At 4 are indicated longitudinally extending angles having flange portions projecting inwardly to support a floor structure, if used, and which may be made of crossboards, laminated structure or plywood or composition, as desired. Similar angles, indicated at 6, overlap the edges of the floor 5 and are rigidly secured to the upright members 7 and 8 and the intermediate upright members 12.

The vertical corner members 7 and 8 at the rear and forward ends are shown as connected by longitudinal rails 10 and cross bars 11. These members may also be formed of tubular structure, and the top may be closed with a roof 16 (Fig. 7) formed of a single sheet or a plurality of smaller sheets, as desired. Gusset plates 9 are indicated as used at the corners.

Figure 2:
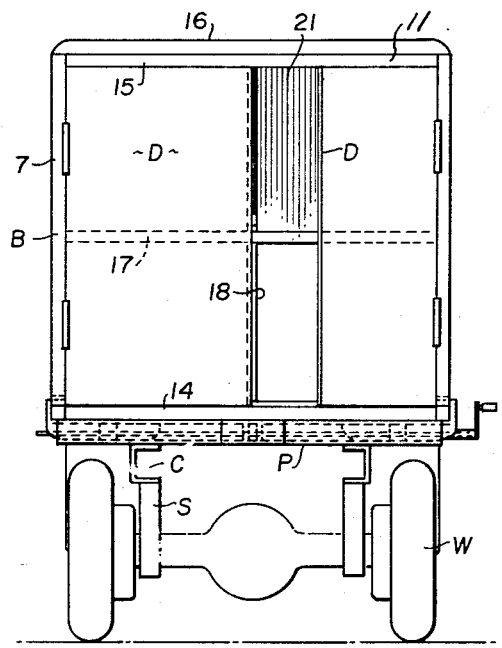
Fig. 2 is a rear elevation of the same.

The roof may be supported by cross members not shown. The side walls may comprise a framework of vertical struts 12 and intermediate horizontals 13, and to which may be fixed side wall sheets or plates 20. The front wall may be closed by sheet material, indicated at 21 in Fig. 2.

Extending transversely of the platform support and fixed upon the frame members C are shown tubular guides 25 within which are arranged transversely extending clamping means for removably securing the containers to the truck frame.

Referring particularly to Fig. 4, slidable inverted channel-shaped members 26 extend inwardly from the ends of and fit within the guides 25. The slides 26 are formed to present rigid clamping hooks 27 adapted to extend upwardly and over the square tubular side rails 1. Fixed in these slidable members 26 are nuts 28, each embracing screw threads on a screw shaft 30. Near the middle of the truck body are shown two collars 32 rotatable with the screw shaft and spaced to embrace a fixed bearing block 33, in turn embracing the screw shaft and thus positioning it longitudinally.

At 34 and 35 are indicated right and left hand screw threads on the screw shaft 30 which coact with the nuts 28 which, of course, are correspondingly threaded. At each end of the screw shaft are provided angular socket receiving portions 36 for the socket of a crank indicated at 40.

It is to be understood that the clamping structure comprises essentially means for supporting clamp carrying slides at each side of the truck by transversely extending members which preferably are positioned between the plane of the surface of the platform or rails, as the case may be, and the longitudinally extending truck frame members C. As indicated, the hollow member 25 may be welded or similarly secured to a transverse supporting member rigidly secured to the truck frame.

This arrangement permits applying the hand crank 40 to the angular ends of the screw at either end of the screw shaft 30, and of turning it to draw the clamps inwardly to secure the material carrying container or conversely to move them outwardly, releasing the clamps from the side rails 1.

Figure 3:
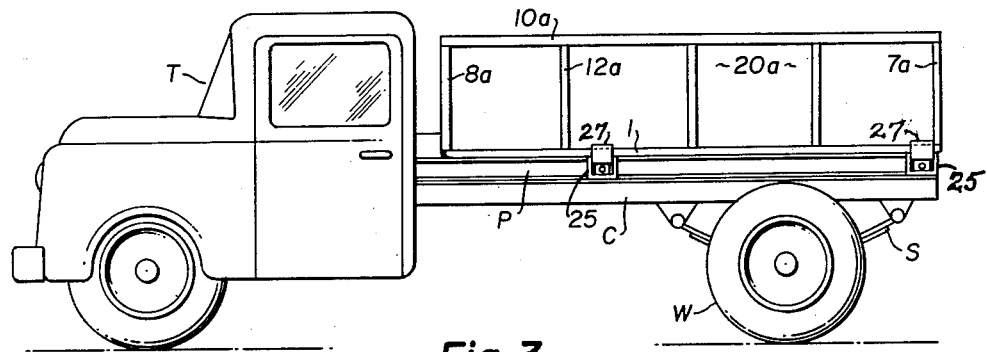
Fig. 3 is similar to Fig. 1, showing an open frame type of container removably carried on a truck frame.

In Fig. 3 is illustrated an open top type of material conatiner which may be used for shipping boards, tubing and other long objects of merchandise, and in which the corner posts 7a and 8a and gussets 9a may correspond to the posts 7, 8 and gussets 9 of the closed container type, the lower side rails and bottom construction being such as to coact with the clamps 27. Here, the top rail 10a and lower side rails are shown as connected with verticals indicated at 12a, and the sides may be open or be closed by plates 20a in the openings, if desired.

In the course of using this apparatus, such a material container as this open type may be transported on a lift truck, cart or the like from place to place to pick up orders of material of different components, sizes, lengths, etc., as is often necessary, for example, in lumber yard order picking. Such a load may then be transferred from the cart while in the container. Then the loaded container may be slid onto the truck platform or frame, and may then be there securely clamped as described.

The closed material containers, of course, may be used for many purposes and may be transferred from the trucks to railway cars. For example, four such containers or more, depending upon the length, may be placed upon a railway flat car. A number of van-type closed containers may be loaded and placed on supports or skids and thus be stored ready for transfer to the trucks.

The foregoing are illustrative only of the many uses to which loads may be made ready for transfer in the container to the truck and for similarly unloading at the delivery end of a trip, from which point an empty container may be returned, thus saving substantial amounts of time and material handling.

It is to be understood that various modifications may be made in the details of the mechanical construction without departing from the spirit of the present invention.

The constructions shown and described, and particularly the coaction of the frame structure and securing means being so constructed as to be effective, simple and easy to operate for clamping and securing and for releasing, has proven successful in actual use of large numbers of such containers. The use of the present system requires only a minimum of alteration of standard truck frame and platform.

Having thus described our invention, what we claim is:

1. In a material handling system, the combination of a plurality of material containing conveyor units each comprising frame structures adapted to support and retain the material and having lower side rails with exposed outer and upper surfaces and forming part of said frame structures, a motor truck having a chassis frame onto which said conveyor units may be moved for transporting them, clamping means on said supporting truck frame including a plurality of spaced apart transverse rectangular tubular guides, clamping elements having channel-shaped portions slidably and non-rotatably movably telescoping into said guides and having portions adapted to extend outwardly from the guides and upwardly over and embrace said lower side rails of the conveyor units, and screw actuated means for moving said rail engaging members into and out of clamping position.

2. The apparatus defined in claim 1 in which the screw element is provided with right and left hand thread portions engaging the slidable clamping elements for moving them inwardly and outwardly simultaneously, and which screw shaft is provided with a portion for receiving a removable crank.

3. An apparatus for use in a material handling and transporting system including a motor vehicle having a chassis provided with loading supporting horizontal frame members, a plurality of material container units each comprising a frame having a floor portion and side walls with lower side frame members adapted to be supported on the vehicle chassis, securing means comprising transversely extending guides fixed in the chassis, slide members in and telescopically engaging said guides for a substantial distance and extending outwardly at each side of the chassis and upwardly in the form of clamping hooks adapted to engage said side rails, and means for simultaneously moving said clamps into and out of engaging position with said lower side rails.

4. The structure defined in claim 3 in which a common screw shaft is longitudinally fixed and provided with right and left hand screw-threaded portions, and each of said slides has a nut engaging one of the screw-threaded portions.

5. The system and apparatus defined in claim 3 in which the material containing units include shallow frames, pallets, and closed body containers.

6. The structure defined in claim 3 in which the frame of the containers comprises hollow tubular horizontal and vertical interconnected frame members.

References Cited in the file of this patent

UNITED STATES PATENTS

| | | |
|---|---|---|
| 1,354,688 | Rice | Oct. 5, 1920 |
| 1,784,975 | Rosman | Dec. 16, 1930 |
| 1,809,539 | Whitcomb | June 9, 1931 |
| 1,988,944 | Hankins et al. | Jan. 22, 1935 |
| 2,021,503 | Fildes | Nov. 19, 1935 |
| 2,117,068 | Ludington | May 10, 1938 |